(12) United States Patent
Walter et al.

(10) Patent No.: US 6,868,211 B2
(45) Date of Patent: Mar. 15, 2005

(54) PROCESS AND APPARATUS FOR FORMING OPTICAL SHUFFLES

(75) Inventors: Marten Walter, Engelstadt (DE); William Hill, Southbridge, MA (US); Kai Olbricht, Ginsheim-Gustavsburg (DE); Markus Schuster, Main (DE)

(73) Assignee: Schott Glas, Mainz (DE)

( * ) Notice: Subject to any disclaimer, the term of this patent is extended or adjusted under 35 U.S.C. 154(b) by 7 days.

(21) Appl. No.: 10/352,623

(22) Filed: Jan. 28, 2003

(65) Prior Publication Data

US 2004/0146268 A1 Jul. 29, 2004

(51) Int. Cl.$^7$ .................................... G02B 6/44
(52) U.S. Cl. ........................ 385/114; 385/147
(58) Field of Search ........................ 385/100, 115, 385/114, 147; 65/479

(56) References Cited

U.S. PATENT DOCUMENTS

| | | | | |
|---|---|---|---|---|
| 3,786,840 A | * | 1/1974 | Courtney-Pratt et al. | 139/11 |
| 5,232,738 A | * | 8/1993 | Verville | 427/163.2 |
| 5,540,797 A | * | 7/1996 | Wilson | 156/180 |
| 5,661,826 A | * | 8/1997 | Saito et al. | 385/17 |
| 6,324,325 B1 | * | 11/2001 | Booth et al. | 385/114 |
| 6,464,404 B1 | | 10/2002 | Robinson et al. | |

FOREIGN PATENT DOCUMENTS

JP        2000019369 A  *  1/2000  ............ G02B/6/44

* cited by examiner

*Primary Examiner*—Juliana K. Kang
(74) *Attorney, Agent, or Firm*—Volpe and Koenig, P.C.

(57) ABSTRACT

A process for automatically forming optical shuffles, which included providing a plurality of spools are provided, which are each formed from at least one fiber. The free ends of the fibers are led up to a winding device and fixed to the latter in such a way that the fibers can be wound onto it in one and the same winding direction and lying approximately parallel to one another. The sections of the fibers coming from the spool are combined with one another in groups to form ribbons. A first length section of each ribbon is unwound from the associated spool and wound onto the winding device (input side of the shuffle). After the length section has been unwound, the spools or fiber-guiding devices connected downstream of the spools are reorganized, so that, in a direction running transversely with respect to the unwinding direction, the outgoing fibers assume different positions relative to one another than before. A second length section of all the fibers is unwound from the spools and wound onto the winding device, the fibers coming from one spool crossing the fibers coming from another spool and a shuffle section thus being formed. Finally, on the output side of the shuffle, a further section of ribbons is provided, which can subsequently be provided in groups with plugs.

14 Claims, 4 Drawing Sheets

PROCESS AND APPARATUS FOR FORMING OPTICAL SHUFFLES

BACKGROUND

The invention relates to a process and an apparatus for automatically forming so-called optical shuffles. These are special cables based on optical fibers. These can be formed both of multi-mode fibers and of single-mode fibers. The fiber materials utilized are glasses of an extremely wide range of compositions, and also plastics, so-called plastic optical fibers (POF). The choice depends on the application.

The starting material considered is individual fibers, and also may include fiber ribbons.

The fibers are usually arranged in a manual process in such a way that, from an arrangement of a plurality of bundles of fibers (input side), a plurality of bundles of fibers (output side) with a very complex channel organization is produced by reorganizing the fibers. Depending on the application, an extremely wide range of configurations of channel organizations can be selected, for example for switches, for crossover connections and so on.

In the processes known hitherto, following the manual organization, both the input lines and the output lines are fixed in a connecting step to form parallel cables. The fixing serves for simplified assembly, for example of commercially available plugs. In this case, typically six to twelve fibers are combined in a row on the input side and on the output side.

One drawback with previous production is the extremely high involvement of personnel. This means high costs. A further drawback of the methods and apparatuses known hitherto is the inadequacy of the fabrication and also the lack of accuracy and the insufficient dimensional stability of the products produced.

SUMMARY

The object of the present invention is to provide a process and an apparatus for fabricating optical shuffles, that avoids the aforementioned drawbacks. The fabrication is to be simplified and automated, and the products produced should be capable of being produced in a reproducible way with the requisite accuracy.

This object is achieved by the features of the invention.

In the process according to the invention, the fibers are provided on a plurality of moveable spools. These are each formed from a single fiber, but if appropriate also from groups of fibers.

The free ends of the fibers are then led up to a winding device—generally to a roll. Here, the fibers lie at least approximately parallel beside one another and, on the roll, form the rows of fibers which are subsequently to be fitted with plugs. In addition, they generally extend at right angles to the axis of rotation of the roll. In this case, the fibers are laid on the outer surface of the roll and fixed to this in such a way that they can be wound up in one and the same winding direction.

Then, the fibers coming from the spools are combined with one another in groups, so that they can form a fiber ribbon with one another. This can be done by the fibers coming from the spools in each case having a synthetic resin compound applied to them and being cured, for example by means of UV irradiation.

During the winding operation, a separator is placed between the individual groups (ribbons), in order to prevent the groups bonding adhesively to one another.

Then, the fibers are unwound from the spools and wound onto the winding device. A specific length section of a dimension L1 of each ribbon is unwound.

A guiding and separating device can be provided between the individual ribbons. Such a device ensures that the ribbons run onto the winding device in an ordered way.

A further step provides for the reorganization. Here, first of all the separator between the ribbons is removed; the spools are reorganized in the sense in which, in a direction running transversely with respect to the unwinding direction, they assume different positions relative to one another than before. If this is an arrangement having three ribbons of four fibers each, then reorganization of the individual fibers can be achieved by manual or automated resorting of the spools.

Following such a reorganization of this spool sequence, a second length section L2 of all the fibers is unwound from the spools to which they belong and is wound onto the winding device. In the process, the fibers from one spool cross with the fibers of other spools. A shuffle section is formed thereby.

A separating and guiding device can then be provided again. This may be located upstream of the winding device. It could be compared with a comb which has a plurality of teeth. The individual teeth in each case engage between the fibers coming from a spool. Such a comb-like device can be displaced in the unwinding direction, so that it is located at a short distance from the winding device.

In addition to resorting the sequence of the fibers on the winding device, the number of ribbons can also be changed in the process, so that, for example, an arrangement of two ribbons each having six fibers is produced. Following the sorting process, this fiber bundle is again combined into separate ribbons by means of adhesive bonding. The section is likewise rolled up on the roll to a length L3.

The shuffle section can be combined together by means of an appropriate housing.

It is then possible for all the fibers to be separated from the remaining fiber sections located on the spools.

However, further unwinding and resorting of a further optical shuffle can also be performed, which is subsequently separated from the first.

The aforementioned housing can be provided during the unwinding and winding operation, or else later.

A particularly advantageous feature in the process according to the invention and the apparatus according to the invention is the simple production of optical shuffles of relatively great lengths. The length of the total optical shuffle may be between 0.1 and 300 m.

The advantage of the process lies in the automation of the manual organization process of the individual fibers, for example of the individual optical fiber. It is possible for very long cables to be produced in a relatively simple way. In any case, the cable length can be longer than in the case of the manual process.

Instead of reorganizing the individual spools—as viewed in a direction transversely with respect to the unwinding direction—it is also possible to guide the fibers through eyes or other guide devices and merely to moving these guide devices, and in this case, leave the spools in place. This could be advantageous in the case of high spool weights.

The new configuration of the shuffle section is wound up on a roll. All the shuffles are therefore wound up on the roll as an individual bundle.

Finally, there follows the unwinding of this strand from the roll and its breakdown into individual shuffles, by means of a separating device not shown here, and the subsequent fitting of plugs.

The winding operation and the unwinding operation can be carried out continuously or discontinuously.

BRIEF DESCRIPTION OF THE DRAWINGS

The invention is explained in more detail using the drawings, in which, in detail.

DETAILED DESCRIPTION OF THE PREFERRED EMBODIMENTS

Figure 1:
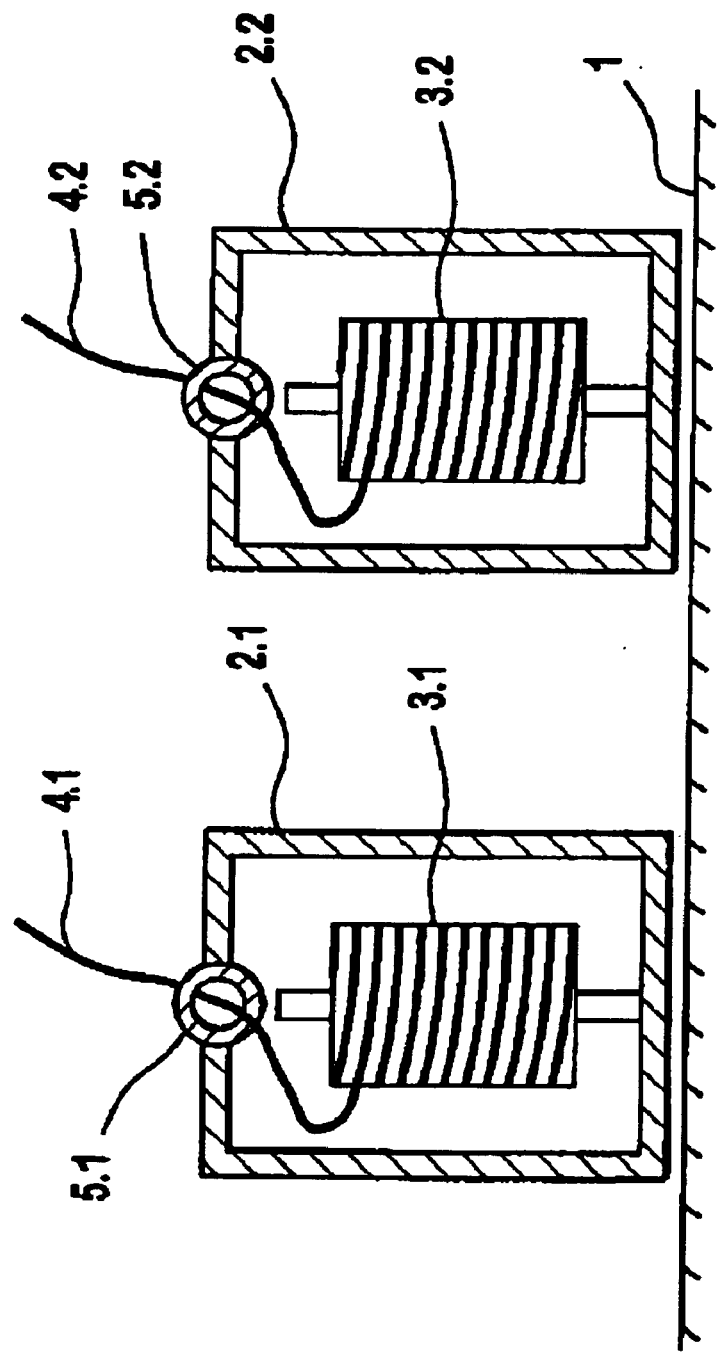
FIG. 1 shows spools as constituent parts of an apparatus for producing optical shuffles.

FIG. 1 reveals the following:

Two housings 2.1, 2.2 are arranged on a baseplate 1. Each housing encloses a spool 3.1, 3.2. A fiber 4.1 and 4.2 is in each case wound on the spool. The fiber is led through an eye 5.1 or 5.2 which, in turn, is fixed to the housing 2.1 or 2.2.

The housings 2.1, 2.2 and therefore also the spools located in them can be displaced on the baseplate 1.

While two spools are shown, the apparatus normally has more than just two spools.

In the present case, each spool 3.1, 3.2 carries a single fiber 4.1, 4.2. However, fiber arrays can also be arranged on a spool In the apparatus shown in FIG. 2, a plurality of spools—four spools in the present case—are shown. Each spool again carries a single fiber 4.1 or 4.2 or 4.3 or 4.4.

The fibers are unwound from their spools and fed to a combining station 6.1. There, they are in each case connected to one another to form a fiber composite (ribbon). The joining can be performed by applying a combining compound and by means of subsequent UV curing.

It is possible to see further combining stations 6.2, 6.3. For reasons of clarity, the associated spools with the associated fibers have been left out.

In general, twelve fiber composites are produced. This therefore means that twelve combining stations are provided, having a corresponding number of spools.

The three ribbons—each comprising four fibers—then pass to guide devices 7.1, 7.2, 7.3. These guide devices are connected upstream of a roll 8. They are used to feed the three ribbons to the roll in an ordered way. The ribbons are fixed on the roll 8 at their free ends.

The roll 8 can be rotated in the direction of the arrow B. It can be driven in both directions.

Figure 3:
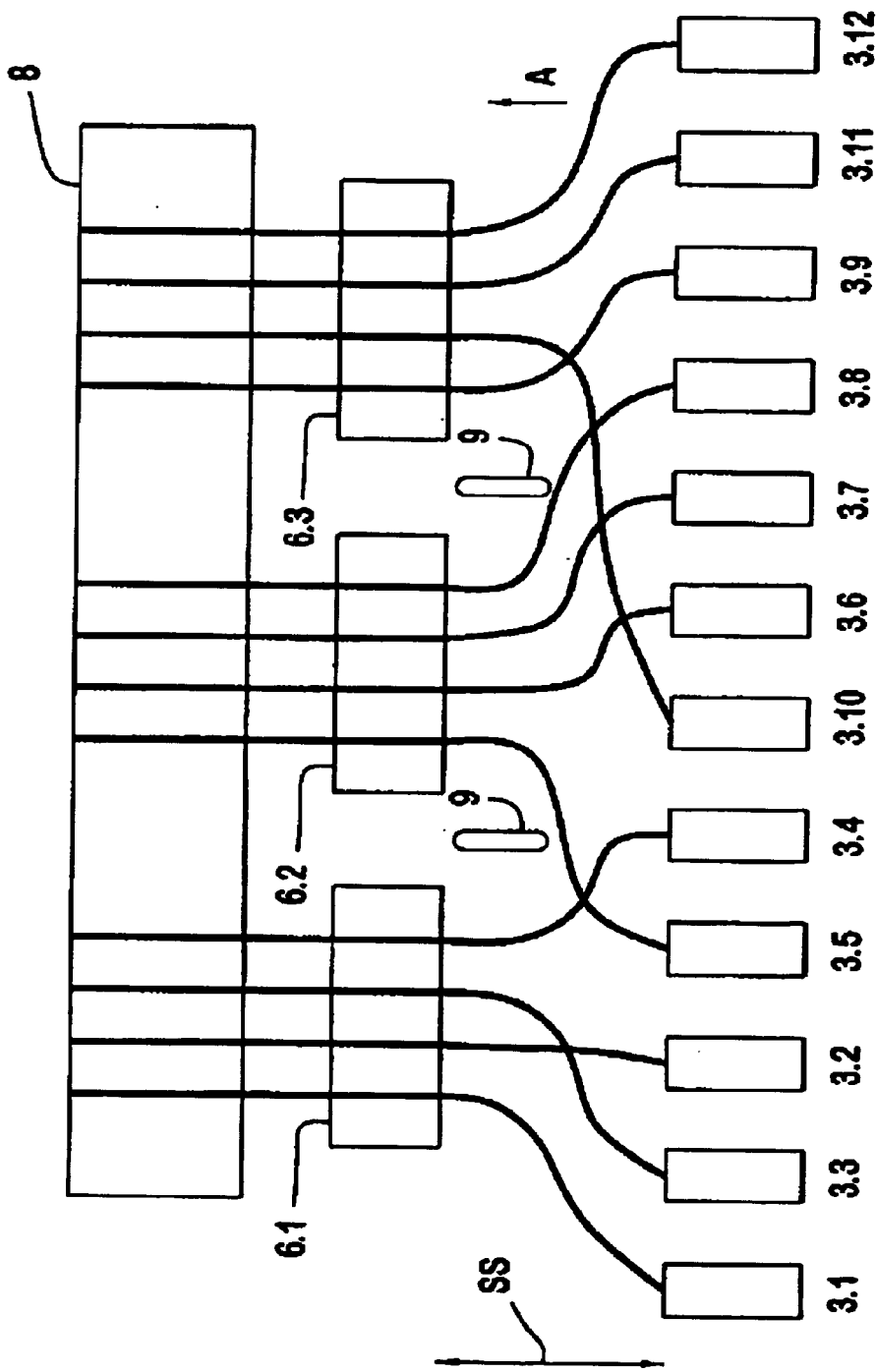
FIG. 3 shows the subject of FIG. 2 following the reorganization of the spools.

The overall apparatus illustrated in FIG. 3 for producing optical shuffles comprises twelve spools. 3.1–3.12. Each spool in turn carries a single fiber 4.1–4.12.

Figure 2:
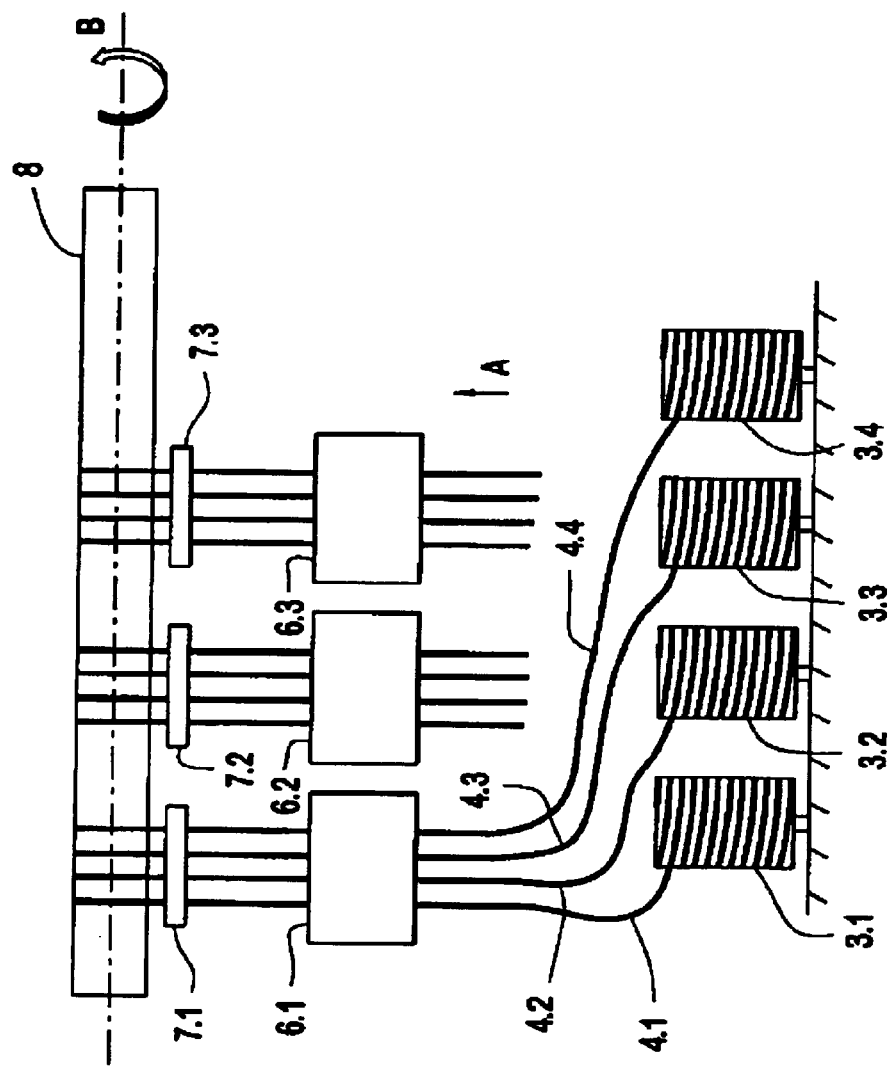
FIG. 2 shows in schematic form an overall system for the production of optical shuffles.

If this figure is compared with FIG. 2, it can be seen that the spools have been reorganized, and therefore so have the fibers. As a result of this reorganization of the spools, the desired shuffle section SS is produced. In the process, separating walls 9 are inserted between each two ribbons. These separating walls can be a constituent part of a single guide device. The guide device and therefore also the spools can be displaced in the unwinding direction—see arrow A.

Here to, it is again possible to see combining stations 6.1, 6.2, 6.3 for combining four fibers in each case to form a ribbon.

The new configuration of the shuffle section is wound up on the roll 8. All the shuffles are therefore wound up on the roll as a single strand.

Finally, there follows the unwinding of this strand from the roll and its breakdown into individual shuffles by means of a separating device, not shown here, and the subsequent fitting of plugs.

The winding operation and the unwinding operation can be carried out continuously or discontinuously.

Figure 4:
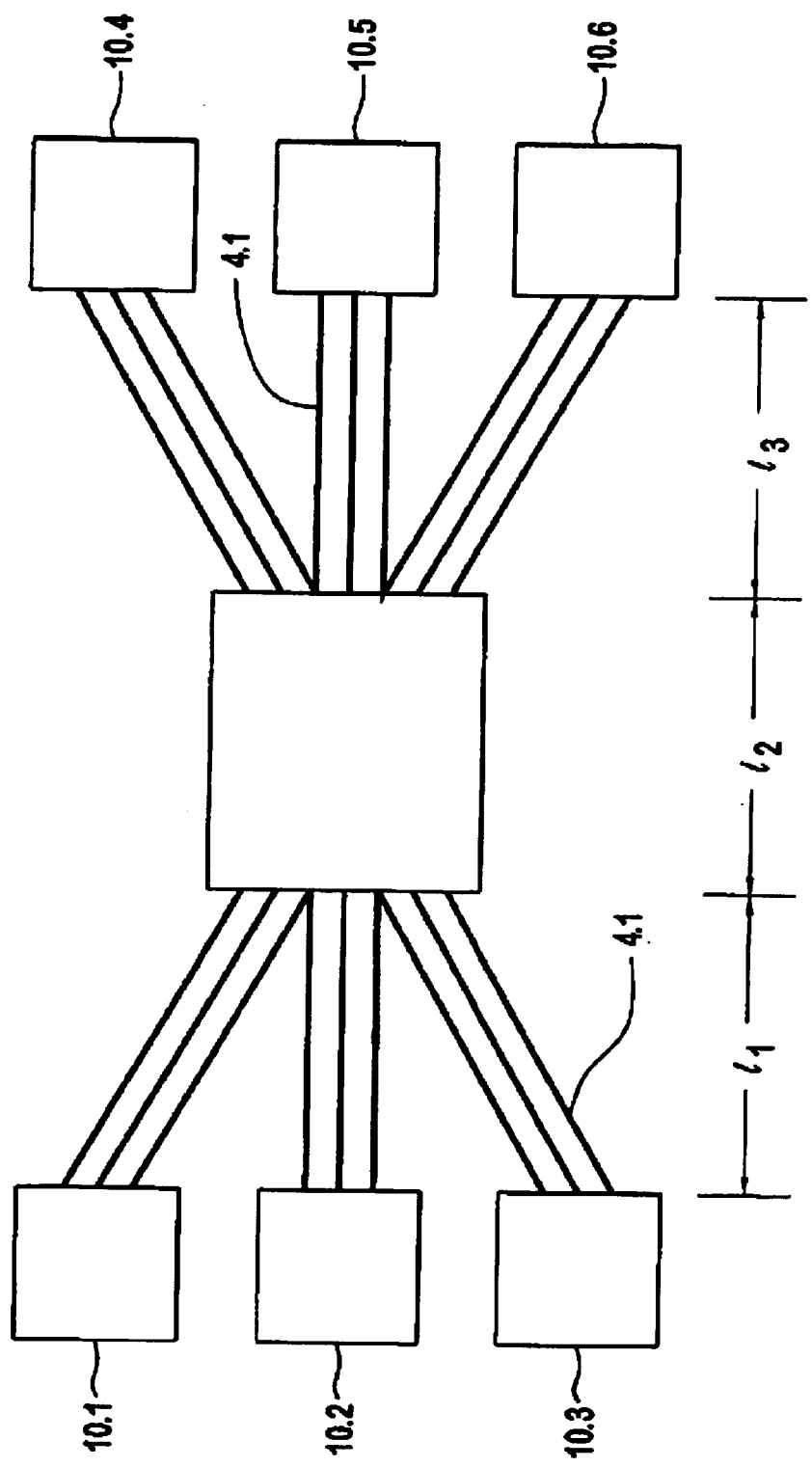
FIG. 4 shows a finished optical shuffle.

FIG. 4 shows the end product, an optical shuffle.

In an input area $1_1$, it is possible to see three ribbons, each formed from three individual fibers. It is also possible to see a housing $1_2$. Finally, it is also possible to see an output area $1_3$, in which there are in turn three ribbons.

In the output area $1_3$, the fibers have been reordered—therefore in a different way from that in the input area $1_1$. The fiber 4.1 is shown only by way of example. In the input area $1i$, as can be seen, this fiber is located at a quite different point than that in the output area $1_3$.

It is also possible not just to change the order of the fibers 4.1. . . . Instead, the number of ribbons can also be changed, so that, for example, an arrangement of two ribbons each having six fibers is produced from an arrangement of three ribbons each having four fibers.

In the input area $1_1$, the fibers are further combined to form a composite (ribbon)—as mentioned above, for example by means of adhesive bonding. Before entering the housing $1_2$, this adhesive bonding has to be removed. It is renewed in the output area $1_3$, in which the fibers are combined again.

Finally, one can also see plugs 10.1–10.3 on the input side and 10.4–10.6 on the output side.

List of Reference Numbers

1 Baseplate
2.1, 2.2, . . . Housing
3.1, 3.2, . . . Spool
4.1, 4.2, . . . Fiber
5 Eye
6 1, . . . Combining station
7.1, . . . Guide devices
8 Roll
9 Separating walls
10.1 . . . Plug

What is claimed is:

1. Process for automatically forming an optical shuffle, comprising:

providing a plurality of spools (3.1 . . . 3.12), each having at least one optical fiber (4.1 . . . 4.12);

affixing free ends of the optical fibers to a winding device (8) so that the optical fibers can be wound onto the winding device in one winding direction and lying approximately parallel to one another;

combining groups of optical fibers coming from the spools with one another to form ribbons;

unwinding a first length section ($1_1$) of each optical fiber from the associated spool (3.1–3.12) and winding the first length ($1_1$) onto the winding device (8);

after the first length section ($1_1$) has been unwound, reorganizing the spools (3.1 . . . 3.12) or fiber-guiding devices connected to the fibers downstream of the spools so that, in a direction extending transversely with respect to the unwinding direction, the outgoing optical fibers from the spools assume different positions relative to one another than before;

unwinding a second length section ($1_2$) of the optical fibers from the spools (3.1 . . . 3.12) and winding the optical fibers onto the winding device (8), the optical fibers from at least one of the spools crossing the optical fibers from another one of the spool to form a shuffle section; and forming new optical fiber groups, which are combined into a third section ($1_3$) of ribbons.

2. Process according to claim 1, wherein the optical fibers (4.1 . . . 4.12) are guided in the winding direction before they are wound onto the winding device (8).

3. Process according to claim 1, wherein the winding device is a linear pulling device for producing the lengths $1_1$, $1_2$, and $1_3$.

4. Process according to claim 1, wherein the unwinding operation from the spools (3.1 . . . 3.12) and/or the winding operation onto the winding device (8) is carried out discontinuously.

5. Process according to claim 1, wherein the unwinding operation from the spools (3.1 . . . 3.12) and/or the winding operation onto the winding device (8) is carried out continuously.

6. Apparatus for automatically forming optical shuffles, comprising: a plurality of spools (3.1 . . . 3.12), each having at least one optical fiber (4.1 . . . 4.12);

a device for leading free ends of the optical fibers (4.1 . . . 4.12) to a winding device (8) and for fixing the free ends to the winding device (8), the winding device being configured to wind the optical fibers (4.1 . . . 4.12) thereover in one winding direction and lying approximately parallel to one another;

a device for joining the optical fibers from the spools together to form at least one ribbon;

a drive for driving the winding device (8) in a first and in a second direction;

a device for reorganizing the spools or guide devices for the optical fibers in such a way that following reorganization, in a direction transverse to the unwinding direction, the optical fibers assume other positions relative to one another than before; and a separating device for separating the optical fibers or the at least one ribbon.

7. Apparatus according to claim 6, further comprising a device to guide the optical fibers or the at least one ribbon and which is connected indirectly or directly upstream of the winding device (8).

8. Apparatus according to claim 7, wherein the guide device comprises a comb having teeth that engage between the optical fibers or the at least one ribbon coming from the individual spools, the comb being displaceable in the winding direction.

9. Apparatus according to claim 6, wherein the spools (3.1 . . . 3.12) are displaceable for reordering the optical fibers (4.1 . . . 4.12).

10. Apparatus according to claim 6, wherein in order to reorder the optical fibers (4.1 . . . 4.12) in a shuffle section (SS), guide eyes (5.1 . . . 5.12) are provided between the spools (3.1 . . . 3.12) and combining stations (6.1 . . . 6.12) in order to combine the optical fibers (4.1 . . . 4.12) into ribbons.

11. Apparatus according to claim 6, wherein for reordering the optical fibers (4.1 . . . 4.12) in a shuffle section SS, both the spools (3.1 . . . 3.12) and the guide eyes (5.1 . . . 5.12) are displaceable.

12. Apparatus according to claim 6, wherein linear units are provided in order to draw the sections $1_1$, $1_2$, $1_3$.

13. Apparatus for automatically forming optical shuffles, comprising:

a plurality of spools positioned to generally define a line transverse to an unwinding direction, each of the spools having at least one optical fiber a device for joining the optical fibers from the spools together to form at least one ribbon;

a device for leading ends of at least one of the optical fibers and the at least one ribbon to a winding device for winding thereover; and a device for reorganizing the spools for the optical fibers in such a way that following reorganization, at least one of the spools is in a different position relative to the other spools while the spools continue to be positioned to generally define the line transverse to the unwinding direction, wherein after reorganization the at least one fiber from at least one of the spools crosses the at least one fiber of another spool to create a shuffle section.

14. Apparatus for automatically forming optical shuffles, comprising:

a plurality of spools each of the spools having at least one optical fiber;

a plurality of fiber-guiding devices positioned to generally define a line transverse to an unwinding direction, the fiber-guiding devices being positioned downstream from the spools, a device for joining the optical fibers from the spools together to form at least one ribbon;

a device for leading ends of at least one of the optical fibers and the at least one ribbon to a winding device for winding thereover; and a device for reorganizing the fiber-guiding devices for the optical fibers in such a way that following reorganization, at least one of the fiber guiding devices is in a different position relative to the other fiber-guiding devices while the fiber-guiding devices continue to be positioned to generally define the line transverse to the unwinding direction, wherein after reorganization the at least one fiber associated with the at least one of the fiber-guiding devices crosses the at least one fiber associated with another fiber-guiding device to create a shuffle section.

* * * * *